MAGNETIC CORE ARRAYS

Filed Dec. 31, 1954 2 Sheets-Sheet 1

INVENTOR.
JULIAN SALTZ
BY Morris A. Rabkin
ATTORNEY

INVENTOR.
JULIAN SALTZ
BY Morris A. Rabkin
ATTORNEY

United States Patent Office 2,824,294
Patented Feb. 18, 1958

2,824,294

MAGNETIC CORE ARRAYS

Julian Saltz, Philadelphia, Pa., assignor to Radio Corporation of America, a corporation of Delaware Application December 31, 1954, Serial No. 479,038

13 Claims. (Cl. 340—174)

This invention relates to magnetic core arrays, and to fabrication methods for such arrays.

Arrays of magnetic cores are used both for switching electrical signals and storing information. For example, in a copending application by Jan A. Rajchman and for Richard O. Endres, Serial No. 375,470, filed August 20, 1953, entitled "Memory System," (now Patent No. 2,784,391, issued March 5, 1957), there is described a three-dimensional, random access memory employing magnetic cores. This three-dimensional memory includes a plurality of two-dimensional arrays of magnetic cores. The arrays are physically arranged in parallel with one another. The respective cores are embedded in a plastic sheet to form a memory plane. The cores of each memory plane are then wired together so that binary coded information may be written into or read out of a given memory position a word at a time, a word consisting of a number of binary digits. Each digit of a word is stored in a different one of the memory planes and the respective digits of a word are stored in cores, each of which occupies a similar position within the respective planes. Access to a given memory position is obtained by means of a magnetic core switch termed an "end" switch. Each core of the end switch is coupled to all the cores in one memory position by threading an access wire through the switch core and the aligned memory cores. Access to the individual digits of a word is obtained by means of digit plane windings which are individually linked to every memory core in one of the two-dimensional arrays.

A simplified means for providing the digit-plane windings, comprising printed circuit techniques, is described in an application by Jan. A. Rajchman, Serial No. 455,724, filed September 13, 1954, entitled "Magnetic Storage Device." However, considerable labor and expense are entailed in the fabrication of large capacity, three-dimensional memories due to the necessity of threading and soldering the large number of access wires. Magnetic memories may also be provided with switch matrices of switch cores for addressing the memory for writing information into and reading information out of a selected memory address.

It is an object of the present invention to provide a further improved method of fabricating a magnetic core array, and to provide an improved array.

Another object of the present invention is to provide an improved means whereby the access lines of an information storage array are linked to the memory cores.

Still another object of the present invention is to provide an improved method of and means for fabricating a large capacity, random access, magnetic memory.

The above and further objects of the present invention are carried out by depositing an electrical conductive fluid in its liquid state through the magnetic cores of an array to form the access lines of the array. The array may be comprised of a plurality of two-dimensional arrays arranged in a three-dimensional array with the magnetic cores aligned in groups.

In the case of a magnetic memory, each memory plane may have an individual sensing winding linking every memory core in the plane. The sensing winding may be comprised of a conductive coating which is suitably etched or printed to form the sensing winding. An insulating coating is then sprayed onto both surfaces of each plane including the inside walls of the cores. The planes are then physically arranged in parallel with the respective digit-storing cores in register. A conductive material having a melting point lower than the insulating coating is then deposited in each group of cores by means of pouring or drawing the material through each group of aligned memory cores. The conductive material is contained in rows by providing a suitable gasket intermediate each two memory planes. The memory end of the system may be sealed by means of a metal plate. Each row of the conductive material then comprises an access wire and can be coupled readily to an individual switch core at the switch end of the system.

The novel features and advantages of the present invention, as well as the invention itself, will be more fully apparent from the following detailed description when read in connection with the accompanying drawing in which similar elements are designated by like reference numerals, and wherein.

Figure 1:
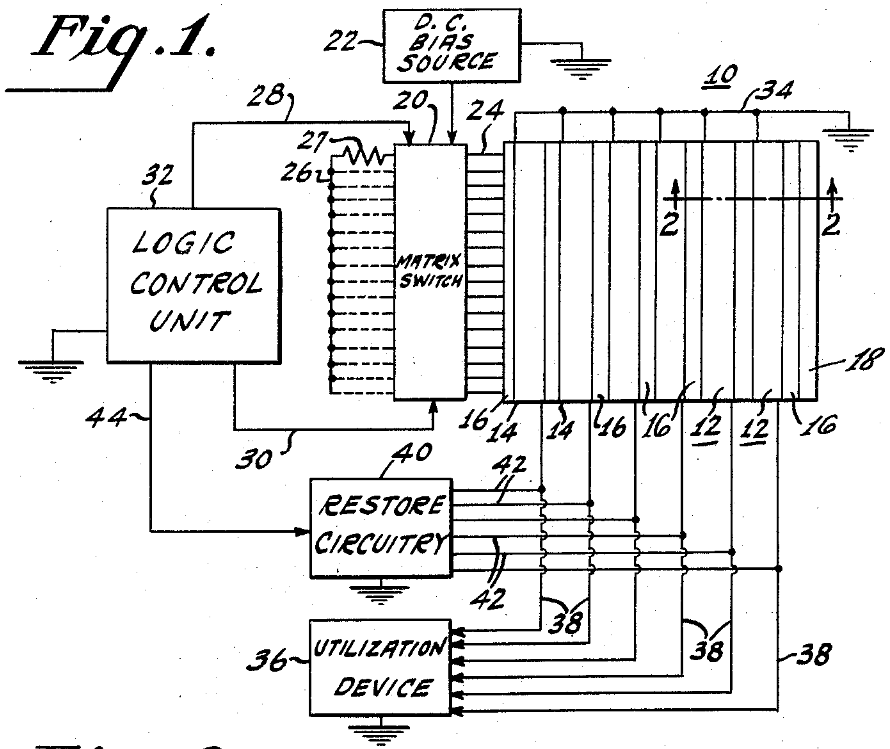
Fig. 1 is a schematic drawing of a memory system according to the invention with the memory array shown in end view.

Referring to Fig. 1, the memory system 10 comprises a three-dimensional array of memory planes 12. Each of the memory planes 12 is comprised of a two-dimensional array of memory cores contained in a square matrix arranged in rows and columns by means of a non-magnetic retaining material, for example, a plastic binder. Details of the construction of this type of memory plane are described in the above-mentioned application, Serial No. 375,470 (Patent No. 2,784,391). An individual sensing winding 14 is linked in the known checkerboard fashion through every memory core of an array 12.

Figure 2:
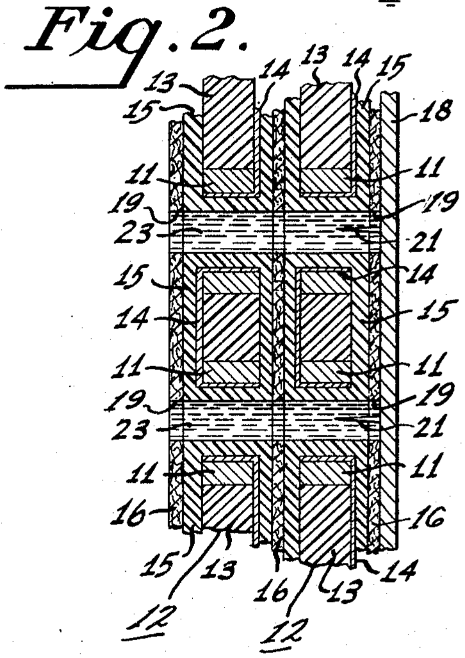
Fig. 2 is a somewhat enlarged section along the line 2—2 of Fig. 1 which is taken through two of the memory planes in order to show the arrangement of the sensing windings and the row wires.

Details of the construction of a memory plane are best shown in Fig. 2 which is a cross-sectional view taken along the line 2—2 of Fig. 1 and includes portions of one column in two different ones of the memory planes 12. Each sensing winding may be comprised of an electrically insulated wire which is threaded through every memory core in a memory plane 12. Each sensing winding 14 may also be comprised of a metallic conductive coating which is sprayed onto both surfaces of the plastic binder 13 including the inside walls of the memory cores 11. The conductive coating is then removed, for example, by vapor-blasting portions of both surfaces to form a sensing winding 14. Alternatively, each memory plane 12 may be comprised of apertured sheets of ferro-magnetic material wherein each memory core is taken as the material limiting one of the apertures. A suitable method of printing a conductive coating in a checkerboard fashion on a planar, apertured sheet is described in the above-mentioned application, Serial No. 455,724. An insulating coating 15 is then sprayed onto both surfaces of the memory plane including the inside walls of the cores 11. A fiber gasket 16 is placed intermediate each two memory planes 12. A gasket 16 is placed against the exposed surface of the first memory plane located at the switch end of the system. Another gasket 16 is placed against the last memory plane located at the memory end of the system. The gaskets 16 are provided with a square array of apertures 19 which may be somewhat larger than the inside diameter of the memory cores 11. A metal plate 18 which is provided with a square array of pins 21 arranged similarly to the arrays 12 of the memory cores is fixed against the gasket 16 at the memory end of the system. A respective pin 21 of the plate 18 is fitted through the corresponding aperture 19 of the gasket 16 to project into the corresponding aperture of one of the memory cores 11 of the last memory plane 12. After the memory planes 12, the gaskets 16, and the metal plate 18 are thus stacked together, a conductive material having a melting point below the melting point of the plastic binder and insulating materials is simultaneously poured through the apertures thus formed. Also, the conductive material may be first drawn through the apertures by means of a partial vacuum until it is observed that each of the rows of apertures is filled with the material, and, then, the metal plate 18 is fixed against the end gasket 16. The gaskets 16 serve to prevent the conductive material from spreading over the surface of a memory plane and confines the conductive fluid to form rows 23. During the pouring or drawing operation, the arrays of memory planes 12 can conveniently be rotated 90 degrees from the position shown in the drawing. One example of a suitable conductive fluid is mercury which is in a liquid state at the operating temperature of the system. Other examples of suitable conductive fluids, such as solder, having a low melting point will be apparent to those skilled in the art. After being poured, the electrical conductive material may return to its solid state at the operating temperature of the system. After the rows 23 are filled with the conductive material, an individual one of the conductors 24 of Fig. 1 is inserted into one of the respective rows 23. Each of the conductors 24 may be provided with a pin similar to the pin 21 in order to assure a low resistance connection to the fluid material. A magnetic end switch 20 is provided. The switch 20 has an array of switch cores arranged similar to the arrays of the memory cores 11 in the memory planes 12. The switch 20 may be similar to the embodiment of the magnetic switch shown in Fig. 2 of the aforementioned application, Serial No. 375,470 (Patent No. 2,784,391). Each switch core is biased to one direction of saturation by a D. C. bias source 22. An individual one of the conductors 24 is used as the output winding of one switch core by threading the conductor 24 through the switch core. The other terminal of each row conductor 24 is connected to one terminal of a differentiating resistance 27. The other terminal of each resistance 27 is connected to a common bus 26. Each individual row of switch cores is linked by an individual one of the leads of a trunk line 28. The trunk line 28 and each of the remaining trunk lines are shown in the drawing as a single line for convenience of drawing. Each column of switch cores of the switch 20 is linked by an individual one of the leads of the trunk line 30. Each lead of the trunk lines 28 and 30 is connected to a different one of the outputs of row and column driver tubes which may be included in the logic control unit 32. One terminal of each sensing winding 14 is connected to a common ground, indicated in the drawing by the conventional ground symbol, by means of the conductor 34. The other terminal of each sensing winding 14 is connected to one of the inputs of a utilization device 36 by means of an individual one of the conductors 38. The other terminal of each sensing winding is also connected to an individual one of the outputs of the restore circuitry 40 by means of a conductor 42. Each of the inputs of the restore circuitry 40 is connected to a like number of outputs of the logic control unit 32 by means of individual leads of the trunk line 44. The logic control unit 32 may be any suitable device, for example, a digital computer, which is adapted to furnish a pulse program for operating the memory system 10. The utilization device 36 may be any device which is responsive to a voltage induced in a sensing winding 14 when a selected core of an array 12 is driven from one state of saturation to the other. The restore circuitry 40 may be similar to that described hereinafter in connection with Fig. 4.

Figure 3:
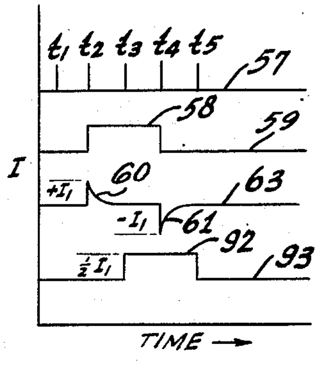
Fig. 3 is a graph of waveforms useful in explaining the operation of the memory system of Fig. 1.
Figure 4:
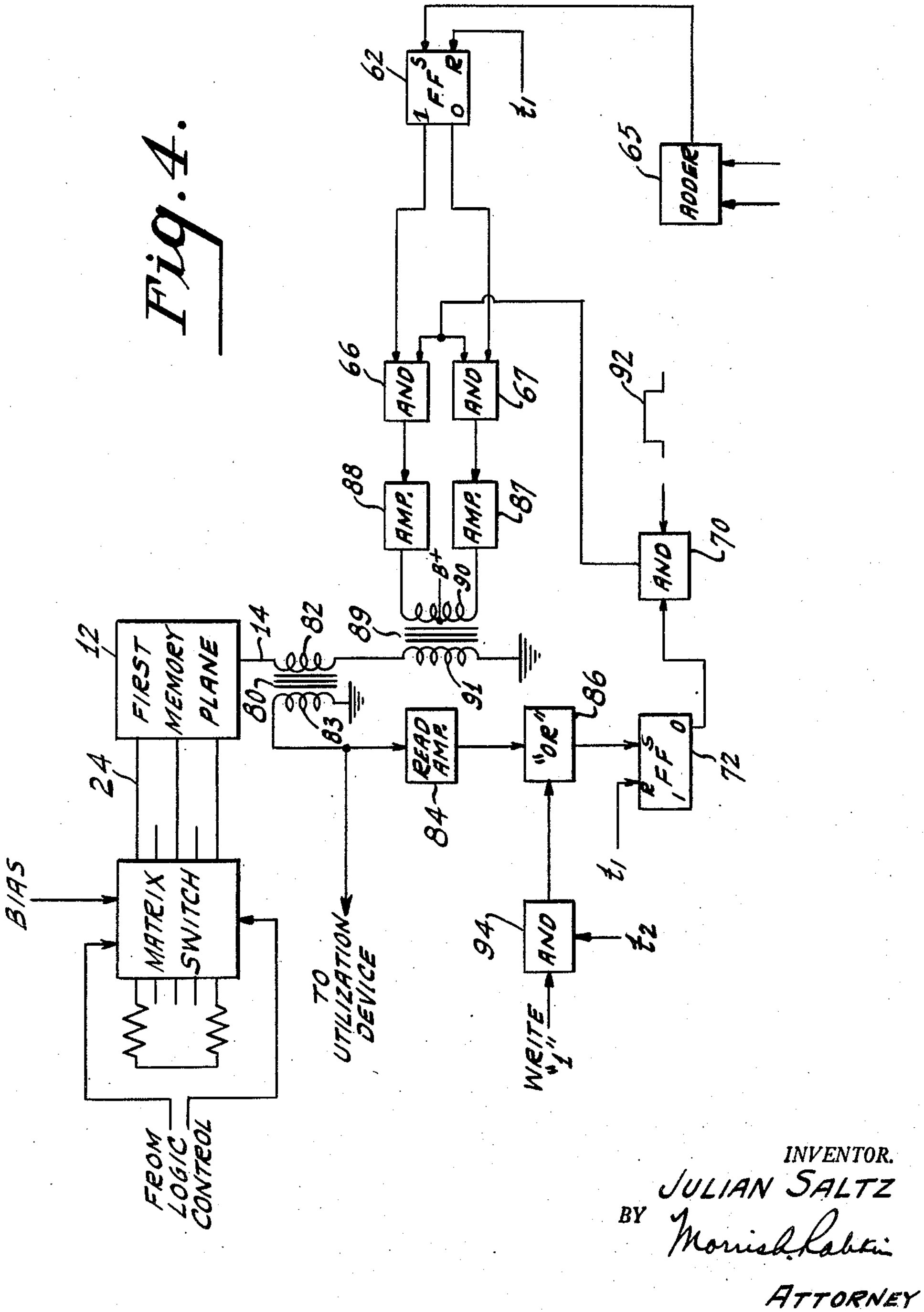
Fig. 4 is a schematic diagram of the restore circuitry associated with one of the memory planes of Fig. 1.

The operation of the memory system of Fig. 1 is described in connection with the waveforms shown in Fig. 3 and the restore circuitry 40 for an individual one of the arrays 12 is shown in Fig. 4. The interrogation and the restoration of binary information into a selected core of each of the arrays 12 are similar. Therefore, the operation is limited to the description of the selection of one memory core of only the first array 12. Assume, now, that it is desired to interrogate the memory core 11 located at the intersection of the first row and the first column of the first array 12. Also, assume that it is desired to restore the information read out of this selected memory core 11. The logic control unit 32 generates a series of timing pulses $t_1$ through $t_5$ shown as waveforms 57 of Fig. 3. After each read-write cycle, the row and column address registers which are connected to the end switch 20 are reset. The row and column address registers are a part of the logic control unit 32. The outputs of the row and column registers are decoded and respectively prime one column driver tube and one row driver tube for operation. The logic control unit 32 then sets up the row and column registers of the end switch with the binary address of the switch core which is coupled to the desired memory position, in this case, the switch core coupled to the conductor 24 of the first row and the first column. The least significant binary digits of the row and column addresses are also applied to a respective one of the two inputs of a binary adder 65 of Fig. 4. The binary adder 65 may be similar to the half-adder described in chapter 13 of "High-Speed Computing Devices," by Engineering Research Association, McGraw-Hill Book Co., Inc., 1950. The adder 65 is arranged to furnish an output signal when both least significant digits are the same, i. e. both "1" or both "0." The output signal of the adder 65 is applier to the set input of a flip-flop 62 raising the voltage level on its "1" output side. Each of the flip-flops employed herein are bistable units well known in the art and are shown in the drawing as a rectangle having the letters FF inscribed. Each flip-flop has a set and a reset input and corresponding "1" and "0" outputs. The "1" output side of the flip-flop 62 primes a two-input "and" gate 66. The "0" output side of the flip-flop 62 is used to prime the two-input "and" gate 67. The function of this portion of the restore circuitry is to compensate for the reversal in magnetizing force in each adjacent memory core when a pulse is applied to the sensing winding 14. This compensation is necessary because each of the switch cores is biased to the one direction of saturation and, consequently, when a switch core is selected, the drive on a row conductor 24 is always in the one polarity followed after a predetermined time by the opposite polarity. However, the polarity of a drive pulse applied to a sensing winding reverses in every other core of a memory plane 12 due to its checkerboard winding. Accordingly, the memory cores 11 coupled to any switch core located at an odd row and odd column, or an even row and even column intersection have one polarity of drive on the sensing winding for one polarity sense pulse. Conversely, the memory cores 11 coupled to any switch core located in the intersection of an even row and odd column, or, vice-versa, have the opposite polarity of drive on the sensing winding for the one polarity sense pulse. Therefore, the binary adder 65 operates to determine whether the selected memory core is located in the one or the other switch core intersection. In the read and the write operations, the various flip-flops are either set or reset at the time $t_1$. At the time $t_2$, the logic control unit 32 applies the pulse 58 of the waveform 59 to the row and column driver tubes of the switch 20. An excitation is thus applied to the one row winding 28 and the one column winding 30 which intersect in the desired switch core by the one primed row and the one primed column driver tube. The desired switch core is thereby driven from the one direction of saturation to the other and the current pulse 60 of the waveform 63 flows in the row conductor 24 which is linked to every memory core 11 at the desired memory position. The amplitude of the current pulse 60 is at least equal to an amplitude which is required to change the magnetization of a memory core 11 along a major hysteresis loop from the one direction of saturation to the other. The return path for the switch pulses 60 and 61 is through the metal plate 18, then through each of the row conductors 24, and then through the common connection 26 to the driven switch core.

Assume for the moment, that the selected memory core is storing a binary one represented by its state N. The positive switch pulse 60, therefore, produces a large flux change in the selected memory core of the array 12 and a relatively large voltage is induced in the sensing winding 14. This relatively large voltage causes a voltage drop across the primary winding 82 of the transformer 80 which in turn induces a voltage in the secondary winding 83. The voltage induced in the secondary winding 83 is applied to the input of a read amplifier 84 and to the input of the utilization device 36 of Fig. 1. The rear amplifier 84 amplifies this voltage and the amplified voltage is passed through the two-input "or" gate 86 to the set input of the restore flip-flop 72 thereby raising the voltage level of its "1" output side. Therefore, the "and" gate 70 is actuated to its unprimed condition. At time $t_3$, the pulse 92 of the waveform 93 is applied to the second input of the "and" gate 70. However, because the "and" gate 70 is in its unprimed condition, the pulse 92 is blocked. At the time $t_4$, the pulse 58 of the waveform 59 is terminated. The D. C. bias returns the driven switch core to the one direction of saturation causing the negative pulse 61 of the waveform 63 to flow in the conductor 24. Therefore, the selected memory core 11 is returned to the one direction of saturation restoring the binary "one" which was read-out.

If, however, the selected memory core were storing a binary zero, represented by the state P, the positive switch pulse causes very little change of flux. Consequently, very little voltage is induced in the sensing winding 14 and the restore flip-flop 72 remains reset. Therefore, "and" gate 70 is primed by the high level voltage from the "0" side of the restore flip-flop 72. At the time $t_3$, the pulse 92 of the waveform 93 is passed through the primed "and" gate 66 to the input of inhibit amplifier 88. The inhibit amplifier 88 is rendered conductive and causes a voltage drop across the primary winding 90 of the transformer 89 thereby inducing an inhibit pulse across the secondary winding 91 of the transformer 89. This inhibit pulse is of the proper polarity to generate a positive sense magnetization in the selected memory core 11 thereby inhibiting the switch pulse 61. At the time $t_4$, the pulse 58 of the waveform 59 is terminated and, accordingly, the driven switch core is returned to the one direction of saturation, and the negative pulse 61 of the waveform 63 flows in the coupled row conductor 24. The pulse 61 is equal in amplitude and of the opposite polarity to the pulse 60. The inhibit pulse flows in the sensing winding 14 of the array 12 during the time interval of the switch pulse 61 of the waveform 63. Therefore, the net magnetizing force generated by the switch pulse 61 of the waveform 63 in the selected memory core 11 is insufficient to alter the state of the memory core 11 to the state N and the binary zero remains stored. If the selected memory core 11 is coupled to an odd row even column switch core or vice-versa, the binary adder 65 does not furnish an output signal. Consequently, the flip-flop 62 is in its reset condition and the "and" gate 67 is primed. Accordingly, the pulse 92 of the waveform 93 is passed through the "and" gate 70 and the "and" gate 67 to the input of the inhibit amplifier 87. The inhibit amplifier 87 is operated and an inhibit current of the opposite polarity flows in the sensing winding 14. Again, the magnetizing force of this inhibit pulse is opposite to the magnetizing force generated by the switch pulse 61 of the waveform 63 in the selected memory core 14 and its state is unchanged.

When it is desired to write a binary one represented by the state N into a selected memory core, the operation is similar to the restore operation when the selected memory core was storing a binary one. In this case, the "and" gate 94 is primed by a write signal furnished by the logic control unit 32. At the time $t_2$, a pulse is passed through the primed "and" gate 94 and the "or" gate 86 to the set input of the flip-flop 72. Accordingly, "and" gate 70 is unprimed and an inhibit pulse is not generated. Therefore, the second switch pulse 61 changes the state of the selected memory core to the state N. When it is desired to write a binary zero represented by the state P into the selected memory core, the logic control unit 32 does not apply a signal to the "and" gate 94 and the flip-flop 72 remains reset. Therefore, the "and" gate 70 is primed and an inhibit pulse is generated. Thus, the switch pulse 61 of the waveform does not succeed in changing the state of the selected memory core back to the state N.

The binary digits of a word are each read into or read out of the respective memory planes 12 in parallel. When a binary digit of the word corresponds to a binary one, a write signal is applied to the input of the restore circuitry associated with that memory plane 12. No write signal is applied to the associated restore circuitry 40 when it is desired to store a binary zero in a memory plane 12.

By providing a matrix switch in which the row, column and bias windings are checkerboarded to correspond to the checkerboarding of the sensing winding of the individual memory planes, the conductive fluid can be poured through the entire assembly of switch and memory cores. In such case, the conductive fluid is chosen to have some electrical resistance in order to dissipate the energy stored in the inductive field when a switch core is driven, thereby improving the access time. A suitable resistance is one having a value in the order of two ohms.

Also, balanced switch drive pulses can be used. One balanced pulse is comprised of a first positive phase followed by a second negative phase, and the phases of the other balanced switch pulse are opposite. By employing balanced drive pulses, the energy stored in the field is cancelled by the next opposite phase. Therefore, the conductive fluid can be comprised of one having a very low electrical resistance. Furthermore, when the matrix switch is thus checkerboarded, the binary adder 65, the flip-flop 62 and one of the "and" gates 64, 66 and one of the inhibit amplifiers 87, 88 can be dispensed with. When balance drive pulses are used, the remaining inhibit amplifier is replaced by a balanced pulse generator which is arranged so as to induce a balanced NP, inhibit pulse comprising a first negative phase and a second positive phase in the coupled sensing winding. The restore circuitry is then made responsive to the voltage induced in the sensing winding to generate the NP, inhibit pulse to prevent the second balanced drive pulse from changing the state of the core when a binary zero is read out.

It is apparent from the above description of the invention that there is provided an improved means for fabricating a random access magnetic memory wherein the laborious task of threading and soldering thousands of access lines is eliminated. The present invention can be operated with matrix switches in which all the switch cores are biased to the one direction of saturation, or with switch matrices wherein the windings are checkerboarded so that the direction of saturation is reversed in every other switch core. Other arrays than the square array described herein may be employed. For example, the array may be rectangular, hexagonal, or any other desired shape. The matrix switch is illustrated herein as a suitable means for driving a memory array. However, it is apparent to those skilled in the art that vacuum-tube drivers may be employed for each memory position, if desired.

What is claimed is:

1. In a system, the combination comprising an array of magnetic cores and access lines linking said cores, said access lines comprising an electrical conductive material deposited in its liquid state through said cores in rows, whereby each row of said conductive material forms one access line.

2. A system comprising a plurality of arrays of magnetic cores and a plurality of gaskets having apertures corresponding to said core arrays, at least one of said gaskets being placed intermediate each two of said arrays.

3. In a memory system, the combination comprising a plurality of memory planes, each of said memory planes including a plurality of memory cores, said memory planes arranged in a three-dimensional array with groups of said cores aligned, and array access lines comprising an electrical conductive material deposited in its fluid state through each of said groups of aligned memory cores.

4. In a memory system comprising a plurality of memory planes, each of said memory planes including a plurality of memory cores fixed in a non-magnetic retaining material, a switch matrix comprising a plurality of switch cores arranged with said memory planes and said switch matrix in a three-dimensional array with groups of said memory cores aligned with a respective one of said switch cores, and access lines for said system comprising an electrical conductive material deposited in its fluid state through said aligned switch and memory cores.

5. In a memory system in accordance with claim 3, each of said memory planes comprising a plurality of individual magnetic cores fixed in a non-magnetic retaining material.

6. In a memory system in accordance with claim 3, including a plurality of sensing windings, each winding comprising a conductive coating arranged to link every memory core of a respective one of said planes.

7. In a memory system in accordance with claim 3, including a plurality of sensing windings each electrically insulated from the said access lines.

8. In a memory system in accordance with claim 3, said system further comprising a binary added circuit having two inputs and an output, said adder circuit being arranged for furnishing an output upon the receipt of an input signal at each of its inputs, and means responsive to said adder circuit for applying a pulse of either one or the other polarity to said sensing winding.

9. In a memory system, the combination comprising a plurality of memory planes, each of said memory planes including a plurality of memory cores, said memory planes being arranged in a three dimensional array with groups of said memory cores being aligned, and at least one gasket having apertures corresponding to the memory cores in a memory plane, one of said gaskets being placed intermediate each two memory planes with the apertures aligned with the memory cores of said planes.

10. In a memory system, the combination comprising a plurality of memory planes, each of said memory planes including a plurality of memory cores, said memory planes being arranged in a three-dimensional array with groups of said memory cores being aligned and at least one gasket having apertures corresponding to the memory cores in a memory plane, one of said gaskets being placed intermediate each two memory planes with the apertures aligned with the memory cores of said planes, and access lines comprising electrical conductive material deposited in its liquid state through each group of memory cores in columns, whereby each column of conductive fluid forms one access line.

11. In a memory system in accordance with claim 10 including a metal plate having a plurality of pins arranged in correspondence with said groups of memory cores, said plate being fixed against the last memory plane at the memory end of the system for containing the fluid in said columns, each of said pins projecting into a respective one of said columns.

12. In a system comprising a plurality of arrays of magnetic cores, each of said arrays including a matrix of rows and columns of said cores, said arrays being arranged with groups of said cores aligned and having windings comprising an electrical conductive material deposited in its liquid state through each of said groups of aligned cores, the said material being in its fluid state at the operating temperature of said system.

13. In a system comprising a plurality of arrays of magnetic cores, each of said arrays including a matrix of rows and columns of said cores, said arrays being arranged with groups of said cores aligned and having windings comprising an electrical conductive material in its solid state through each of said groups of aligned cores, the said material being in its solid state at the operating temperature of said system.

References Cited in the file of this patent

UNITED STATES PATENTS

| | | |
|---|---|---|
| 2,474,988 | Sargrove | July 5, 1949 |
| 2,700,150 | Wales | Jan. 18, 1955 |
| 2,712,126 | Rosenberg | June 28, 1955 |
| 2,716,268 | Steigerwalt | Aug. 30, 1955 |
| 2,724,103 | Ashenhurst | Nov. 15, 1955 |
| 2,732,542 | Minnick | Jan. 24, 1956 |

OTHER REFERENCES

"Electrical Engineering," for February 1954, p. 110, article "Non-Destructive Sensing of Magnetic Cores," by D. A. Buck and W. I. Frank.

"Tele-Tech," for January 1953, pp. 64–66, article entitled "A Printed Circuit Multi-Conductor Plug," by W. D. Novak.

U. S. DEPARTMENT OF COMMERCE

PATENT OFFICE

CERTIFICATE OF CORRECTION

Patent No. 2,824,294 Julian Saltz February 18, 1958

It is hereby certified that error appears in the printed specification of the above numbered patent requiring correction and that the said Letters Patent should read as corrected below.

Column 7, line 54, for "added circuit" read -- adder circuit --.

Signed and sealed this 27th day of May 1958.

(SEAL)
Attest:

KARL H. AXLINE
Attesting Officer

ROBERT C. WATSON
Commissioner of Patents